Aug. 30, 1966 C. H. ROSNER 3,270,247
PROTECTIVE CIRCUIT FOR REMOVING ENERGY FROM SUPERCONDUCTING COILS
Filed Oct. 1, 1964
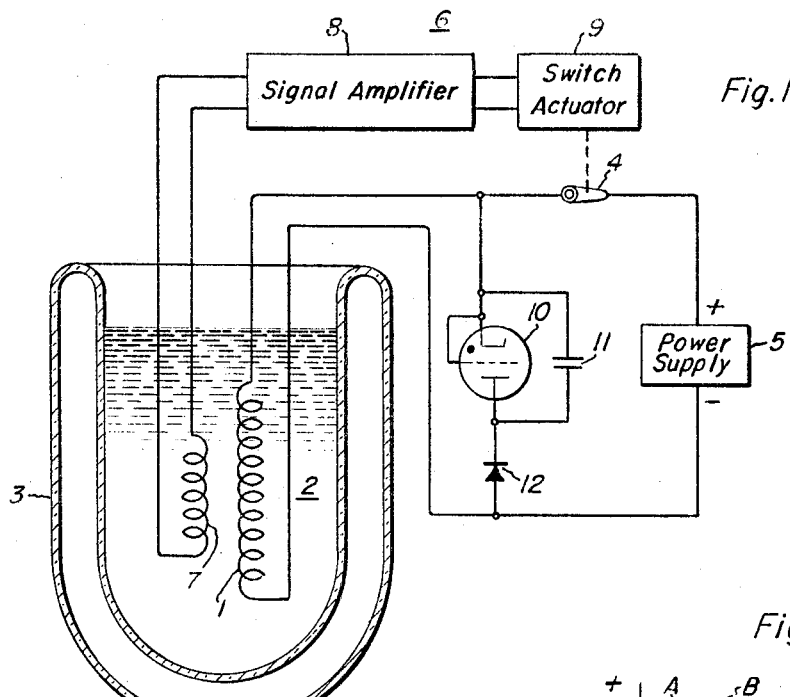
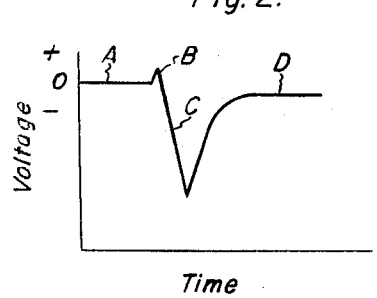
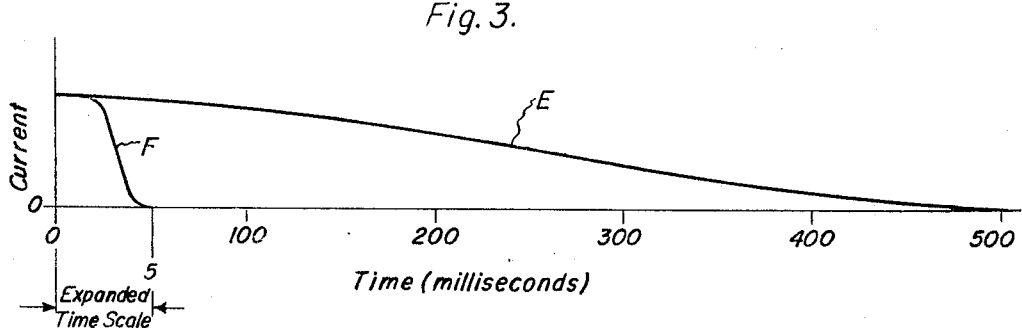
Inventor:
Carl H. Rosner,
by Edward D. Murphy
His Attorney.

United States Patent Office 3,270,247
Patented August 30, 1966

3,270,247
PROTECTIVE CIRCUIT FOR REMOVING ENERGY
FROM SUPERCONDUCTING COILS
Carl H. Rosner, Schenectady, N.Y., assignor to General
Electric Company, a corporation of New York
Filed Oct. 1, 1964, Ser. No. 400,718
5 Claims. (Cl. 317—13)

The present invention relates to means for removing energy from superconducting coils and more particularly relates to means for protecting such devices should a transition from the superconducting state to the normal conducting state occur within the coil.

Superconducting coils are currently available which produce extremely high magnetic fields at correspondingly high current densities, for example $10^5$ amps/cm.$^2$ or more. When such coils are cooled to the superconducting state, their resistance is zero and high currents may be carried by the coil without energy dissipation. However, if the coil for any reason goes into normal conductivity, the resistance increases very quickly and large amounts of heat may be generated with corresponding damage to or destruction of the coil itself as well as possible loss of the surrounding cooling medium. Accordingly, it is necessary in many systems that means be provided which remove energy from superconducting coils as quickly as possible upon the occurrence of normal conduction therein.

Briefly, in accord with one embodiment of my invention, I provide means for the protection of superconducting coils which comprises a sensing means for detecting a transition of the coil to normal conductivity, switching means responsive thereto for disconnecting the superconducting coil from the operating circuit, and a voltage limiting energy transfer system connected across the coil. More specifically, the voltage limiting energy transfer system comprises a circuit which removes the energy from the superconducting coil while maintaining a constant voltage thereacross. In particular, an anode-controlled voltage breakdown device such as a thyratron may be placed in parallel with a capacitor across the superconducting coil. The induced voltage created by interrupting the current flow through the coil fires the thyratron and is quickly reduced to the thyratron operating voltage so that the energy is dissipated or stored in the capacitor without danger of high potential difference appearing within the coil.

The novel features believed characteristic of the invention are set forth in the appended claims. The invention itself, together with further objects and advantages thereof, may best be understood by reference to the following description taken in connection with the appended drawings in which:

FIG. 1 is a schematic illustration of one embodiment of the present invention;

FIG. 2 is a voltage diagram representing the effect on the voltage across the coil of the present invention; and FIG. 3 is a current diagram comparing the current decay in a coil proected in accord with the present invention with that in an unprotected coil.

In FIG. 1, a circuit embodying the present invention is schematically illustrated. The superconducting coil 1 is disposed in a bath of coolant 2 in a Dewar vessel 3 to maintain it below its critical or superconducting temperature. The coil is connected in an operating circuit which comprises a switch 4 and a power supply 5. The power supply provides the power necessary to produce a high current in the coil. Under normal operating conditions, the switch 4 is closed and the power supply produces a current in the coil which in turn creates a high magnetic field to be used for any suitable purpose.

The protection system 6 for the superconducting coil includes a sensor which may comprise a voltage pickup coil 7 or any other means for sensing the development of a normal region in the superconducting coil. For example, a pickup means may be disposed on the mandrel with the superconducting coil as described and claimed in my copending application, Serial No. 379,635, filed July 1, 1964, and assigned to the assignee of the present invention. If a bifilar-wound coil as disclosed therein is used, the wire must be tapped at the midpoint of the winding so that only one-half is used and the inductive sensing is not canceled out by the opposing currents. The system 6 also comprises a signal amplifier 8 and a suitable switch actuator 9. In a preferred embodiment, switch 4 is an electromechanical relay and actuator 9 is an electronic control therefor. The switch actuator is connected so as to open the switch 4 and break the circuit therethrough upon the appearance of a voltage drop across all or part of the superconducting coil 1.

In accord with the present invention, a voltage limiting energy transfer system is connected in parallel with the superconducting coil 1. In the circuit of FIG. 1, this comprises a parallel-connected thyratron 10 and capacitor 11, both connected in series with a diode 12. The diode is provided to prevent oscillation between the coil and the energy transfer circuit.

The operation of the circuit of FIG. 1 is then as follows: Upon the occurrence of normal conductivity over all or a portion of the superconducting coil 1, a signal is generated by the protection system 6, actuating the switch 4 to open the circuit between the coil 1 and the power supply 5. Due to the current flowing in the superconducting coil, a back E.M.F. is induced across the coil which quickly rises to the preselected level necessary to initiate conduction in the thyratron 10, for example, 200–5,000 volts. Before the thyratron ignites, the energy is stored into the capacitor which is selected so as to charge very quickly to the ignition voltage of the thyratron. The charging time is controlled by the time constant of the LC circuit comprising coil 1 and capacitor 11.

Immediately upon firing of the thyratron, the voltage across it reduces to its operating value, in the range of 20–40 volts. Since the coil and the thyratron are in parallel, the voltage drop across the coil is similarly reduced. Current continues to flow in the thyratron, and the capacitor discharges down to a level determined by the thyratron operating voltage, until the energy stored in the coil has been released to one or the other. In addition, a load such as an indicator or simple dissipating resistor may also be provided in series with the capacitor or in parallel therewith.

A particular advantage of this system is that high speed switching is permitted with concurrent voltage limitation. Without some voltage limitation, I have found that the voltage across the coil could rise, due to the high switching rate, to such a value that arcing might occur within the coil causing damage or even total destruction. The present system limits the maximum potential drop to the firing voltage of the thyratron and, after the thyratron has fired, the voltage across the coil is reduced to the operating voltage of the thyratron and simultaneously provides for transfer of energy to the capacitor from which it may be subsequently taken and used. In some cases, the thyratron may be used without the capacitor if a lower rate of energy transfer can be tolerated. However, in most situations, the combination of the two is required.

A graph illustrating the variation of the voltage across the superconducting coil 1 with time is illustrated in FIG. 2. The initial portion A, when the voltage is zero, represents a period of superconducting operation. At a given time, the coil or a portion thereof undergoes a transition to normal conductivity and a voltage appears, represented by portion B of the curve. Almost immediately, the exact time being dependent on the time lag of the switch used, the circuit between the power supply and the coil is broken and an induced negative E.M.F. appears across the coil as shown in portion C. This rapidly builds until it reaches the firing voltage of the thyratron at which time it is reduced to the operating voltage of the thyratron, portion D. Thus, the voltages at which arcing might occur within the coil, which may be as low as a few hundred volts, are never reached and the coil is not endangered.

In FIG. 3, an approximate comparison is made of the times required for current decay in the coil with and without the energy transfer system of FIG. 1. Curve E shows the natural decay of current in the coil. In this time, which may be as high as 500 milliseconds, sufficient heating can occur to damage or even destroy the coil 1. Current decay in a circuit including the present invention, shown on an expanded time scale by curve F, may occur within a few milliseconds, an improvement by a factor of 100. It has been found that reducing the current within such times is sufficient to protect the coils from damage.

The present invention is predicated upon the ability of the energy transfer system to provide for dissipation of energy from the coil and at the same time to provide means for limiting the voltage across the superconducting coils so as to prevent damage or destruction thereof due to excessive internal potential differences. Accordingly, it is intended to include in the appended claims all anode-controlled voltage breakdown devices which may be substituted for those illustrated. For example, a silicon-controller rectifier (SCR) may be used in place of the thyratron as well as the triac or other solid state devices. Voltage controlled resistors, such as General Electric Company Thyrite resistors, which begin to conduct at a known voltage and immediately reduce the voltage drop thereacross to a known value are of use where higher voltage limits are permitted. An ignitron may also be used by supplying sufficient energy to the grid thereof, for example by means of a separate battery, so as to convert it into an anode-controlled device.

A capacitor band and/or a load or resistor may of course be used in parallel with any of the voltage breakdown devices as described in the case of the thyratron.

While I have shown and described several embodiments of my invention, it will be apparent to those skilled in the art that many changes and modifications may be made without departing from my invention in its broader aspects. I therefore intend the appended claims to cover all such changes and modifications as fall within the true spirit and scope of my invention.

What I claim as new and desire to secure by Letters Patent of the United States is:

1. Apparatus for protecting a superconducting coil disposed in an operating circuit and subject to transitions to a state of normal conduction comprising sensing means responsive to the occurrence of a potential gradient within said coil for detecting a transition; switching means responsive to said sensing means for disconnecting said coil from said operating circuit; and voltage limiting energy transfer means responsive to a potential gradient within said coil connected to said coil for limiting the potential gradient across said coil while removing energy therefrom.

2. Apparatus for protecting a superconducting coil disposed in an operating circuit and subject to transitions to a state of normal conduction comprising sensing means responsive to the appearance of a potential gradient within said coil for detecting a transition; switching means responsive to said sensing means for disconnecting said coil from said operating circuit; and voltage limiting energy transfer means comprising an anode-controlled voltage breakdown device responsive to a potential gradient within said coil connected in parallel with said superconducting coil for limiting the potential gradient across said coil while removing energy therefrom.

3. Apparatus for protecting a superconducting coil disposed in an operating circuit and subject to transitions to a state of normal conduction comprising sensing means responsive to the occurrence of a potential gradient within said coil for detecting a transition; switching means responsive to said sensing means for disconnecting said coil from said operating circuit; and voltage limiting energy transfer means comprising an anode-controlled voltage breakdown device and a capacitor connected in parallel with said superconducting coil and responsive to a potential gradient within said coil for limiting the potential gradient across said coil while removing energy therefrom.

4. Apparatus for protecting a superconducting coil disposed in an operating circuit and subject to transitions to a state of normal conduction comprising sensing means responsive to the occurrence of a potential gradient within said coil for detecting a transition; switching means responsive to said coil from said operating circuit; and voltage limiting energy transfer means comprising an anode-controlled voltage breakdown device, a capacitor and a resistor connected in parallel with said superconducting coil and responsive to a potential gradient within said coil for limiting the potential gradient across said coil while removing energy therefrom.

5. Apparatus for protecting a superconducting coil disposed in an operating circuit and subject to transitions to a state of normal conduction comprising sensing means responsive to the occurrence of a potential gradient within said coil for detecting a transition; switching means responsive to said sensing means for disconnecting said coil from said operating circuit; and voltage limiting energy transfer means comprising a voltage controlled resistor responsive to a potential gradient within said coil connected in parallel with said superconducting coil for limiting the potential gradient across said coil while removing energy therefrom.

References Cited by the Examiner

UNITED STATES PATENTS

| | | | |
|---|---|---|---|
| 2,456,986 | 12/1948 | Paluev | 317—16 |
| 2,571,027 | 10/1951 | Garner | 317—16 |
| 2,840,766 | 6/1958 | Wouk | 317—16 |
| 3,176,195 | 3/1965 | Boom et al. | 317—13 X |
| 3,214,637 | 10/1965 | Persson | 317—9 |

OTHER REFERENCES

"Energy Removal From a Superconductor Solenoid," IBM Technical Disclosure Bulletin, vol. 6, No. 9, February 1964, pp. 67–68.

MILTON O. HIRSHFIELD, *Primary Examiner.*

SAMUEL BERNSTEIN, *Examiner.*

R. V. LUPO, *Assistant Examiner.*